NONLINEAR TUNNEL RESISTOR AND METHOD OF MANUFACTURE

Filed June 1, 1962 2 Sheets-Sheet 1

INVENTOR.
JOHN T. WALLMARK
BY
W. S. Hill
AGENT

March 22, 1966 J. T. WALLMARK 3,242,389

NONLINEAR TUNNEL RESISTOR AND METHOD OF MANUFACTURE

Filed June 1, 1962 2 Sheets-Sheet 2

INVENTOR.
JOHN T. WALLMARK
BY
W. S. Hill
AGENT

United States Patent Office 3,242,389
Patented Mar. 22, 1966

3,242,389

NONLINEAR TUNNEL RESISTOR AND METHOD OF MANUFACTURE

John T. Wallmark, Princeton, N.J., assignor to Radio Corporation of America, a corporation of Delaware Filed June 1, 1962, Ser. No. 199,376
10 Claims. (Cl. 317—234)

Figure 1:
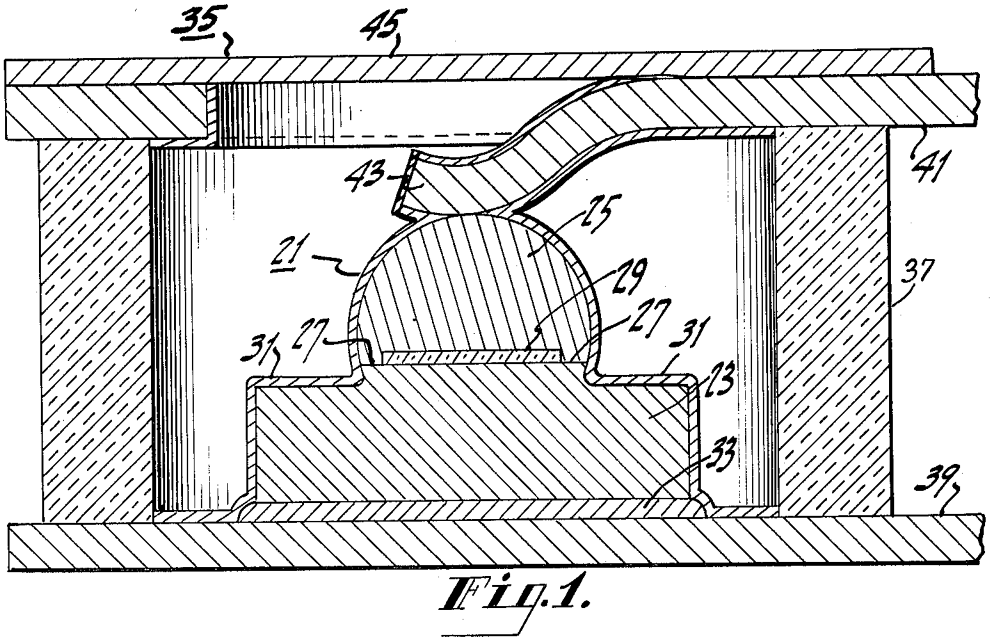

This invention relates to an improved nonlinear tunnel resistor. The invention also relates to a method for making the nonlinear tunnel resistor of the invention.

A nonlinear tunnel resistor includes a tunnel diode and a resistive leakage path around the junction of said diode. A nonlinear tunnel resistor and a method of making it are described, for example, by H. S. Sommers, Jr. in U.S. patent application S.N. 1,019, filed January 7, 1960, now Patent No. 3,119,072. Nonlinear resistors have numerous uses, as described for example, in the Sommers' application. It is particularly useful as a load resistor for a tunnel diode used as an active circuit element, as described by H. Ur in U.S. patent application S.N. 97,204, filed March 21, 1961, now Patent No. 3,168,653.

Previous nonlinear tunnel resistors have been constructed in two ways. In a first structure, a conventional linear resistor of appropriate size is connected in parallel to a tunnel diode. The combination constitutes a nonlinear tunnel resistor. This first structure is adequate for some purposes. However, the structure is not as satisfactory as desired where small size and/or where operation at high frequencies is required. The reason for this is that no matter how close the tunnel diode and the resistor are mounted, stray reactances, mainly at the leads, form a resonant circuit which may allow the combination to oscillate and therefore become unstable.

In a second structure, a tunnel diode is prepared by alloying a metal mass to a semiconductor body. During alloying, a surface portion of disturbed material forms across the tunnel junction. The disturbed surface portion provides a resistive leakage path around the tunnel junction, which surface portion may be adjusted to a desired value of resistance by subsequently reducing the thickness of the portion, as by selective etching. This second structure is small in size and is capable of operating stably up to very high frequencies. However, this second structure is difficult to manufacture economically because certain of the processing steps, particularly the steps of forming the disturbed surface portion and then adjusting the surface portion to a desired thickness, are difficult to control, with the result that the electrical characteristics of the product may vary substantially.

An object of this invention is to provide an improved nonlinear tunnel resistor.

Another object is to provide a method for preparing the nonlinear tunnel resistor of the invention.

In general, the nonlinear tunnel resistor of the invention is a unitary circuit element comprising a tunnel diode and an electrically-conducting layer applied to or deposited on the surface of the diode so as to provide a resistive leakage path for current flow parallel to the current flow through the junction of the tunnel diode. Preferably, the leakage path comprises a metal film on the surface of the tunnel diode. The electrically-conducting layer has an equivalent thickness of about $10^{-5}$ to 10 angstrom units.

The method of the invention comprises producing a tunnel diode, preferably by heating a mass of metal containing one type of conductivity-determining impurity in contact with a semiconductor body of the other conductivity type. Substantially all of the disturbed surface portion normally produced during the processing is removed from the surface of the semiconductor body, particularly adjacent to the junction of the diode, as by etching the surface of the tunnel diode. Then, an electrically-conducting layer is applied to or deposited on the etched surface of the tunnel diode to extend across the junction thereof. The electrically-conducting layer may be continuous or discontinuous and is preferably a metal film having an equivalent thickness of $10^{-5}$ to 10 angstrom units applied by electrode deposition from an aqueous solution.

In the method of the invention, the steps of removing substantially all of the disturbed surface portion normally produced during the processing and then applying or depositing an electrically conducting layer of the desired thickness across the junction of the diode, separates the fabrication procedure into two separate and individually easily controllable steps, resulting in a high yield of product with substantially uniform electrical characteristics. The process also results in a new product which is small in size, can operate at high frequencies, and is more stable over a wider range of frequencies than previous nonlinear tunnel resistors.

Figure 2:
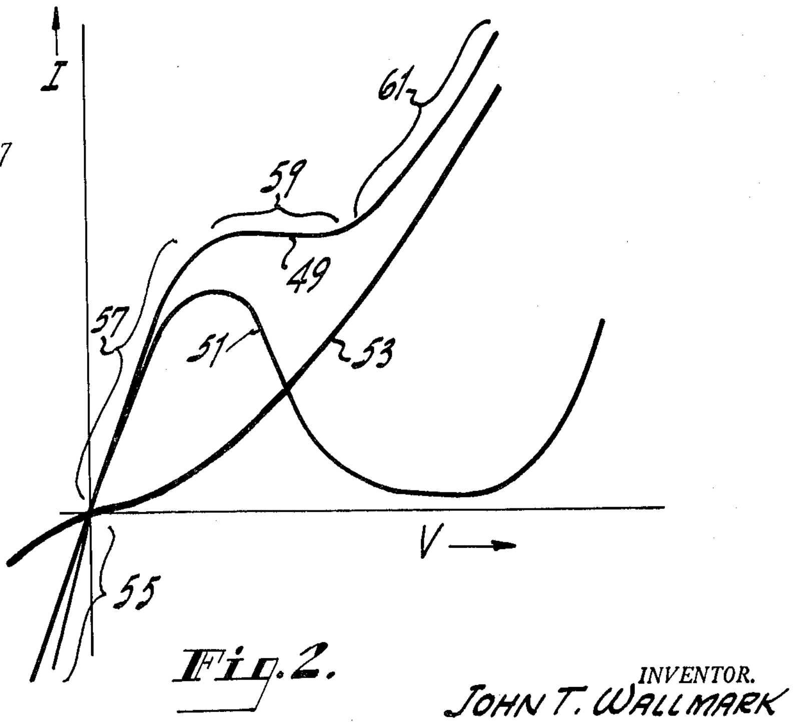
Figure 3:
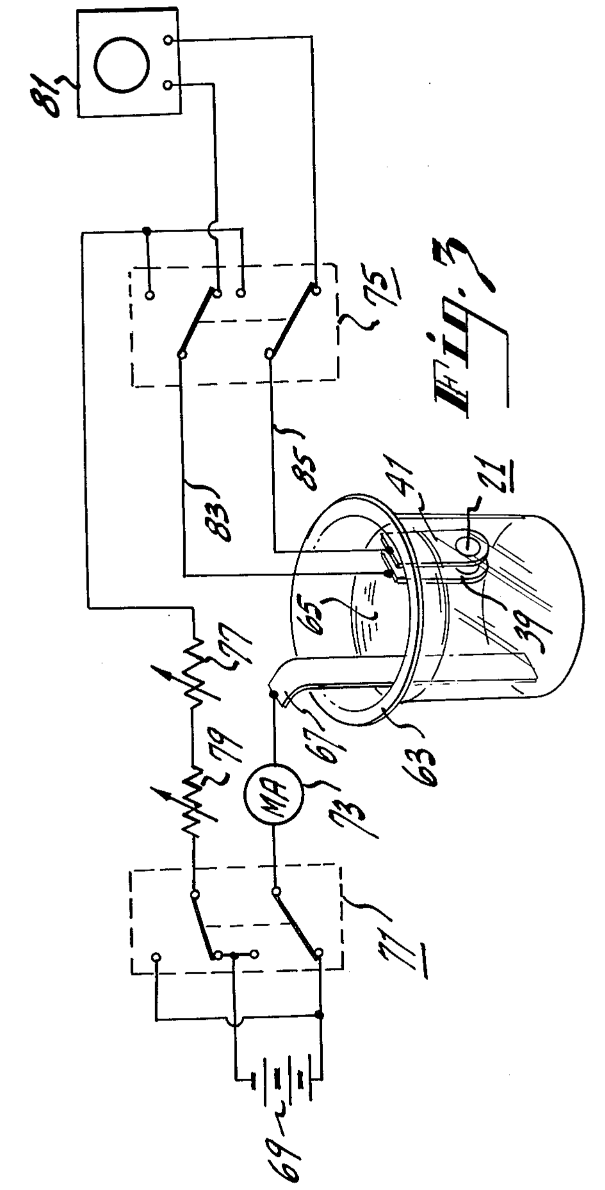

A more detailed description of the invention appears below in conjunction with the drawings in which:

FIGURE 1 is a sectional view of a preferred embodiment of a nonlinear tunnel resistor of the invention, FIGURE 2 is a current-voltage chart which will be referred to in describing the electrical characteristics of the nonlinear tunnel resistor of the invention, and FIGURE 3 is a partially-perspective, partially-schematic view of an apparatus for electrodepositing a metal film on a tunnel diode according to one embodiment of the method of the invention.

Figure 4:
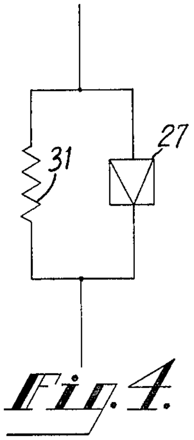

FIGURE 4 is an equivalent circuit of the embodiment of FIGURE 1 showing a tunnel diode and a resistance in parallel.

FIGURE 1 is a sectional view of a nonlinear tunnel resistor 21 of the invention. The resistor 21 comprises a tunnel diode of known design including a body 23 of near degenerate semiconductor material. A mass 25 of metal is alloyed to the body 23 producing two contiguous regions of opposite conductivity type and a tunnel junction 27 therebetween. The body 23 includes conductivity-determining impurities of one type, and the metal mass 25 includes conductivity-determining impurities of the other type. The diode illustrated in FIGURE 1 includes a circular electrically-insulating layer 29 between the body and the metal mass 25 (which is also circular) positioned so that the junction 27 is a thin peripheral region. The junction 27 may vary in width and may have discontinuities around the edge of the electrically-insulating layer 29.

An electrically-conducting layer 31 is in the form of a metal film having an equivalent thickness of about $10^{-5}$ to 10 angstrom units. The layer 31 contacts the semiconductor body 23, extends across the junction 27, and contacts the metal mass 25, providing a resistive leakage path for electric current between the metal mass 25 and the semiconductor body 23. The resistance of the leakage path is designed to impart to the nonlinear tunnel resistor 21 a substantially constant current characteristic in an intermediate range of forward bias voltages.

The nonlinear resistor 21 is mounted in an enclosure 35 comprising a ceramic ring 37, a lower metal closure member 39 brazed thereto and closing one end of the aperture in the ring 37, an upper metal contact member 41, brazed thereto across the other end of the aperture in the ring 37, and an upper metal closure member 45 brazed to the contact member 41. The semiconductor body 23 is held to the lower closure member 39 within the aperture of the ring 37 with a quantity of solder 33.

A finger 43 extends from the contact member 41 into ohmic contact with the metal mass 25. The lower closure member 39 and the contact member 41 provide electrical connections to the nonlinear tunnel resistor 21.

The curve 49 of FIGURE 2 shows the current-voltage characteristic of the nonlinear resistor of FIGURE 1. The expected characteristic of the tunnel junction 27 without the resistive layer 31 is represented by the curve 51. The expected characteristic of the electrically-conducting layer 31 in the absence of the tunnel junction is represented by the curve 53. The characteristic curve 49 of the nonlinear resistor 21 is a composite characteristic obtained by combining the characteristic 51 of the tunnel junction 27 and the characteristic 53 of the electrically-conducting layer 31. Because the tunnel junction 27 and the layer 31 are connected in parallel, the current through the nonlinear resistor 21 is the sum of the currents through the two parallel paths at each value of voltage across the connections to the nonlinear resistor 21. Preferably, the tunnel junction 27 and the electrically-conducting layer 31 are designed to provide a composite current-voltage characteristic 49 including a first portion 55 in which the current through the device increases in response to increased reverse bias voltage, a second portion 57 in which the current increases in response to increased forward bias voltage of relatively small values, a third portion 59 in which the current through the device is substantially constant in response to increased forward bias voltage of intermediate values or range, and a fourth portion 61 in which the current through the device increases in response to increased forward bias voltage of relatively large values.

The tunnel junction 27 may be in any geometry and may be produced by any convenient process. A tunnel junction produced by the alloying technique is preferred. The tunnel junction may have any ratio of peak current to valley current and may have any current carrying capacity. The characteristics of the electrically conducting layer 31, which is positive resistance, is matched to the negative resistance characteristic of the tunnel junction to provide the desired conductance in the intermediate voltage range in the forward direction. This matching is achieved by the selection of the material and the design of the width and equivalent thickness of the electrically-conducting layer 31. The surface which receives the electrically-conducting layer 31 should be substantially free of disturbed material, so that the resistive leakage path is substantially entirely attributable to the characteristics of the electrically-conducting layer 31.

The electrically-conducting layer 31 may be of any conducting material, preferably a film of a metal having an equivalent thickness of about $10^{-5}$ to 10 angstrom units. Because most metal atoms are several angstrom units thick, the electrically-conducting layers described herein are specified by an "equivalent thickness." The "equivalent thickness" is obtained by dividing the volume of the deposited metal by the area over which it is distributed. For example, a monomolecular layer of metal atoms covering 1% of a surface has an equivalent thickness of 1% of the atomic diameter of the metal atoms. Some suitable metals are nickel, gold, aluminum, copper and silver. Combinations of different metals may also be used. The metal film may be deposited or applied in any convenient way, as by deposition from a vapor, by electroplating, or by electroless deposition from a liquid. The metal film may be continuous or discontinuous. C. A. Neuberger et al., "Electrical Conduction Mechanism in Ultra-Thin Evaporated Metal Films," Journal of Applied Physics, 33, 74 (1962), states that very thin discontinuous metal films can provide a resistive path for electric current with relatively high conductance. The current may jump to and from islands of one or more metal atoms on the surface of the semiconductor.

A particular nonlinear tunnel resistor of the invention may be prepared by the following procedure with reference to FIGURE 1. A mask having a circular aperture about 0.004 inch in diameter is placed on a major face of a rectangular single crystal body 23 of germanium about 0.10 inch by 0.10 inch by 0.020 inch thick and containing arsenic in proportions to impart a donor concentration of about $4.0 \times 10^{19}/cm.^3$. Silicon oxide is deposited through the mask upon the surface of the body to form a layer 29 about 0.0001 inch thick. The mask is removed leaving a circular electrically-insulating layer 29 on a major face of the body 23. A metal dot about 0.005 inch in diameter by about 0.001 inch thick and comprising about 99 weight percent indium, 0.05 weight percent zinc and 0.5 weight percent gallium is placed with a small amount of commercial flux on the electrically-insulating layer 29 in a position approximately concentric therewith. The assembly is heated at about 450° C. for about 60 seconds in an atmosphere of dry hydrogen and then rapidly cooled, so as to melt the dot and to alloy a portion of the dot to the germanium body 23, thereby forming a tunnel junction 27. The heating and cooling is conducted for as short a time interval as possible so as to produce as abrupt a junction 27 as possible. The alloyed unit is placed with the body 23 on the lower closure member 39 of an enclosure 35 and with the finger 43 on the mass 25. Small amounts of a low melting temperature solder are placed between the body 23 and the lower closure member 39, and the mass 25 and the finger 43. The finger 43 holds the unit in place by spring pressure. The assembly is heated to about 200° C. for about 60 seconds and then rapidly cooled, so as to solder the body 23 to the lower closure member 39, and to make an ohmic contact between the finger 43 to the dot 25. The soldered assembly is immersed for about 5 seconds in a slow iodide etch solution, and is then rinsed in distilled water. During the immersion, substantially all of the disturbed surface portion of the semiconductor body 23 is removed by etching, especially in the region where the junction 27 extends to the surface. The disturbed surface portion is that portion which normally forms during the steps of manufacturing the device. Some of the undisturbed semiconductor material of the body 23 also may be removed as a matter of convenience or to adjust the current carrying capacity or other characteristic of the tunnel junction 27. A suitable slow iodide etch comprises 100 ml. water and one drop of a solution comprising 0.55 gram potassium iodide, 10 ml. concentrated acetic acid, 100 ml. concentrated hydrofluoric acid and 100 ml. water. After etching, the resulting tunnel diode in this case has a characteristic like that of curve 53 of FIGURE 2 with a peak current of about 46 milliamps at about 60 millivolts and a valley current of about 3 milliamps at about 240 millivolts.

FIGURE 3 illustrates an apparatus for electroplating a thin metal layer 31 across the junction 27. The apparatus comprises a container 63 holding a plating bath 65. In this example, the plating bath contains about 32 ozs. nickel sulfate, 6 ozs. nickel chloride and 4 ozs. boric acid per gallon of water. The bath has a pH of about 4.5 to 6.0. A nickel anode 67 is immersed in the solution, and is connected to a direct current power source 69, such as a battery, through a polarity reversal switch 71 and an ammeter 73 connected in series. The lower closure member 39 and the contact member 41 of the enclosure 35 are connected through leads 83 and 85 respectively to two terminals of a push button microswitch 75. When the microswitch 75 is depressed to the "plate" position, the leads 83 and 85 are connected together to the power source 69 through a fine adjustment rheostat 77, a coarse adjustment rheostat 79, and the polarity reversal switch 71, all connected in series. As shown in FIGURE 3, when the push button microswitch is in the "read" position, the leads 83 and 85 are connected to an oscilloscope which is arranged so that the current-voltage characteristic of the non-linear resistor may be read. The foregoing arrangement permits the current-voltage characteristic to be monitored intermittently as the electro-deposition proceeds.

In operation, the partially constructed nonlinear tunnel resistor is connected to the leads 83 and 85 and immersed in the plating solution 65 as illustrated to constitute a cathode. Electric pulses of about 1 to 10 milliamperes, preferably about 5 milliamperes, for a duration of 0.5 to 10 seconds, preferably about 5 seconds, are passed through the cathode and the plating solution 65 by depressing the push button microswitch 75 to the "plate" position for the desired time interval. The plating current is adjusted with the coarse and fine rheostats 79 and 77. After each pulse, the microswitch 75, returns to the "read" position and the characteristics of the nonlinear resistor are displayed on the oscilloscope 81. The metal film 31 is built up to a thickness which imparts the desired composite current-voltage characteristic.

When the desired thickness of metal film 31 is reached, the unit is removed from the plating bath, washed thoroughly in distilled water and then dried. The current-voltage characteristic of the finished unit described is shown by the curve 49 of FIGURE 2. Because of the electroplating process used, the metal film extends over all of the exposed surfaces of the body 23, the metal mass 25 and of the metal parts of the enclosure 35. The thickness of a nickel metal film 31 is calculated to have, for a particular case as an example, an equivalent thickness of about 0.2 angstrom units, which is less than an atomic layer thick. The metal film 31 is believed to be in the form of conducting islands of metal atoms, and it is thought that conduction along the film 31 takes place by a tunneling phenomenon.

What is claimed is:

1. A unitary circuit element comprising a tunnel diode including a pair of semiconductor regions and a tunnel junction therebetween, connections to each of said regions, and an electrically-conducting layer applied to the surface of said regions, so as to provide a resistive leakage path between said regions, said electrically-conducting layer having a resistance such that the composite current-voltage characteristic between said connections include a first portion in which the current increases in response to increased reverse bias voltage, a second portion in which the current increases in response to increased forward bias voltage of relatively small values, a third portion in which the current is substantially constant in response to increased forward bias voltage of intermediate values, and a fourth portion in which the current increases in response to increased values of forward bias voltage of relatively large values.

2. A unitary circuit element comprising a tunnel diode including a pair of semiconductor regions and a tunnel junction therebetween, and a metal layer deposited on the surface of said diode so as to provide a resistive leakage path between said regions, said layer having an equivalent thickness of between about $10^{-5}$ and 10 angstrom units.

3. A unitary circuit element comprising a tunnel diode including a pair of semiconductor regions and a tunnel junction therebetween, and a metal layer electroplated on the surface of said diode, said layer providing a resistive leakage path between said regions, said layer having an equivalent thickness of between about $10^{-5}$ and 10 angstrom units.

4. A semiconductor device comprising a body including two contiguous semiconductor regions of opposite conductivity type defining a tunnel junction therebetween, said junction extending to an undisturbed surface of said body, and a layer of an electrically-conducting material deposited upon said undisturbed surface across said junction, said layer having an equivalent thickness of between about $10^{-5}$ and 10 angstrom units and providing a resistive path for current flow parallel to the current flow through said junction.

5. A semiconductor device comprising a semiconductor body including two contiguous semiconductor regions of opposite conductivity type defining a tunnel junction therebetween, said junction extending to an undisturbed surface of said body, and a metal film electrodeposited on said undisturbed surface of said regions and extending across said junction, said film having an equivalent thickness of between about $10^{-5}$ and 10 angstrom units.

6. A method for preparing a unitary circuit element comprising preparing a tunnel diode including a tunnel junction extending to a surface thereof, removing from said surface substantially all of the disturbed surface portion normally produced during the preparation thereof, depositing a layer of a electrically-conducting material on said surface and extending across said junction and providing connections to each side of said junction, said electrically-conducting layer having an equivalent thickness such that the composite current-voltage characteristic between said connections includes a range in which the current between said connections is substantially constant in response to changes in forward bias voltage applied therebetween.

7. A method for preparing a unitary circuit element comprising contacting a semiconductor body containing a high concentration of one type of conductivity-determining impurities with a metal mass including a concentration of the other type of conductivity-determining impurities, heating said contacted body and mass to alloy said mass into said body and to form a tunnel junction therein, said junction extending to a surface of said body, removing from said surface substantially all of the disturbed surface portion normally produced during said heating step, and depositing a layer of an electrically-conducting material on said surface and extending across said junction, said layer having an equivalent thickness of between about $10^{-5}$ and 10 angstrom units.

8. A method for preparing a unitary circuit element comprising contacting a semiconductor body containing a high concentration of one type of conductivity-determining impurities with a metal mass including a concentration of the other type of conductivity-determining impurities, heating said contacted body and mass to alloy said mass into said body and to form a tunnel junction therein, said junction extending to a surface thereof, etching said surface to remove substantially all of the disturbed surface portion normally produced during said heating step, and then depositing a layer of a metal having an equivalent thickness of between about $10^{-5}$ and 10 angstrom units on said surface, said metal layer extending across said junction.

9. A method for preparing a unitary circuit element comprising contacting a semiconductor body containing a high concentration of one type of conductivity-determining impurities with a metal mass including a concentration of the other type of conductivity-determining impurities, heating said contacted body and mass to alloy said mass into said body and to form a tunnel junction therein, said junction extending to a surface of said body, removing from said surface substantially all of the disturbed surface portion normally produced during said heating step, and then electro-depositing a metal film having an equivalent thickness of between about $10^{-5}$ and 10 angstrom units on said surface, said film extending across said junction.

10. A method for preparing a unitary circuit element comprising contacting a semiconductor body containing a high concentration of one type of conductivity-determining impurities with a metal mass including a concentration of the other type of conductivity-determining impurities, heating said contacted body and mass to alloy said mass into said body and to form a tunnel junction therein, said junction extending to a surface thereof, etching said surface to remove substantially all of the disturbed surface portion normally produced during said heating step, and then electro-depositing a metal film having an equivalent thickness of between about $10^{-5}$ and 10 angstrom units on said etched surface, said film extending across said junction to provide a resistive leakage path for current flow parallel to the current flow through said junction.

References Cited by the Examiner

UNITED STATES PATENTS

| | | | |
|---|---|---|---|
| 2,781,480 | 2/1957 | Mueller | 317—235 |
| 2,954,486 | 9/1960 | Doucette et al. | 307—88.5 |
| 3,040,188 | 6/1962 | Gaerthner et al. | 307—88.5 |
| 3,089,038 | 5/1963 | Rutz | 307—88.5 |
| 3,114,864 | 12/1963 | Chih-Tang Sah | 317—235 X |

OTHER REFERENCES

Electronics: Three Approaches to Microminiaturization by Robert Landgord, Dec. 11, 1959, (pages 49 to 52).

JOHN W. HUCKERT, *Primary Examiner.*

GEORGE N. WESTBY, *Examiner.*